Patented Jan. 27, 1931

1,790,461

UNITED STATES PATENT OFFICE

OSCAR A. CHERRY, OF CHICAGO, ILLINOIS, ASSIGNOR TO ECONOMY FUSE AND MANUFACTURING COMPANY, OF CHICAGO, ILLINOIS, A CORPORATION OF NEW YORK

CONDENSATION PRODUCT OF UREA AND FORMALDEHYDE

No Drawing.   Application filed June 3, 1927. Serial No. 196,395.

This invention relates to, the processes of making condensaton products from formaldehyde or its polymers and urea, thiourea or its derivatives, and the products made thereby.

It has been found in condensing urea, thiourea or its derivatives with formaldehyde or its polymers, that various products are formed depending upon several sets of conditions to which the reaction is subjected which are: first, the ratio of the amounts of urea and formaldehyde employed, and secondly, upon the condition prevailing as to whether or not the condensation is conducted in the presence of an alkaline, neutral or acid solution.

It has been determined by past experiments that several different substances are formed as a result of condensing urea with formaldehyde depending upon the prevailing conditions referred to, and that among these products are the following: first, methylene urea $CO(NH)_2CH_2$ and dimethylene urea $CO(NCH_2)_2$; secondly, an intermediate product formed from two molecules of urea and three molecules of formaldehyde with the elimination of two molecules of water, the formula of which is $C_5H_{10}N_4O_3$; and thirdly, monomethylol urea which is $C_2H_6O_2N_2$ and dimethylol urea $C_3H_8O_3N_2$.

The first of these, that is, the methylene urea and the dimethylene urea are quite insoluble in all ordinary solvents and are found to decompose under the action of high temperature without melting. The second or intermediate compound is thick, white, granular precipitate which is not soluble in any solvent, but will be decomposed by strong acids and is unaffected by alkalis. The third group of monomethylol urea and dimethylol urea are both easily soluble in cold water and in alcohol but are insoluble in ether.

It is desirable in the formation of condensation products to be utilized commercially, to avoid the formation of a first and second of these products, in that they consist of minute, white granules having an amorphous structure and are infusible and insoluble in ordinary solvents and are of no known commercial value, but on the other hand it is desirable to form the monomethylol urea or the dimethylol urea or a mixture of these in that these substances are soluble and form a solution which is capable of, upon subsequent heat treatment, polymerizing to form a colloid which upon a continuation of the heat treatment becomes viscid, gradually insoluble and finally gelatinized into a hard, insoluble, infusible vitreous mass.

In view of this, it is desirable to note particularly the conditions which, when prevailing will promote the formation of the monomethylol urea and dimethylol urea to the exclusion of the undesirable condensation products. It has been found in the presence of slightly acid solutions that either methylene urea of dimethylene urea are formed depending upon the amount of formaldehyde employed relative to the amount of urea used, provided however, that the formaldehyde used is less than five parts to one part of urea, but on the contrary, if an excessive amount of formaldehyde, namely, approximately more than five times that of urea is employed, no precipitate is formed, but rather, a solution which is capable of being subsequently gelatinized and hardened, is formed. In addition, it has been learned that it is not necessary to use this excessive amount of formaldehyde to form an initial condensation product which is soluble, provided the solution, in the presence of which the condensing reaction takes place, is basic rather than acid.

As above set forth, the initial condensation product is found to be a soluble substance forming a solution which, on standing in the atmosphere or being heat treated is capable of being gradually gelatinized to form a viscid, intermediate product and finally hardened into an insoluble and infusible substance. Although, the formation when relatively small amounts of formaldehyde to that of urea are employed depends upon the addition of a base to the solution to form the initial product, the final hardening is accomplished by rendering a mass slightly acid which may be effected by any one of several well known methods.

Proceeding with this information, I have also found that one of the principles which effects the condensation reaction between the formaldehyde and urea is that of the hydrogen ion concentration of the solution to which the condensation action is exposed.

I have learned further, that very desirable results can be had by the process of condensing urea with formaldehyde in the presence of a solution, the hydrogen ion concentration of which is approximately $1 \times 10^{-5}$, which process constitutes the subject-matter of my co-pending application Serial No. 193,740, filed May 23, 1927. When the condensation reaction is conducted at the hydrogen ion concentration of $1 \times 10^{-5}$ a condensation product soluble in water is obtained. As the reaction proceeds, this product passes into a colloidally dispersed form which is probably a hydrated form of dimethylol urea. Upon removal of water by distillation and final heat treatment, a jelly-like mass is obtained which finally passes into a hard, toughened product which under some circumstances, depending upon the particular formula employed, will be transparent.

It is important to the understanding of this invention to consider that the hydrogen ion concentration of an absolutely neutral solution is $1 \times 10^{-7}$, and that I have found according to the present invention, as well as the one above outlined and disclosed in my co-pending application referred to, that it is possible to form the soluble products of condensation without resorting to the employment of basic solutions, or even neutral solutions, or to the relatively large amounts of formaldehyde heretofore employed, but on the contrary, with solutions which are in fact, acid and according to the present invention, a solution having a hydrogen ion concentration of approximately $1 \times 10^{-3}$.

In addition to the fact that this hydrogen ion concentration is proper for the formation of the initial product according to the method contemplated by my invention, it is also found that acid solutions are proper for the formation of the intermediate and final products from the initial product. With this in mind, it can be appreciated that in practicing my invention, it is accordingly unnecessary to resort to the introduction of bases, but that the entire process for making the product including the initial condensation and the subsequent hardening, may be conducted in the presence of an acid solution.

It is well known that formaldehyde solutions contain in addition to formaldehyde, an appreciable amount usually about $\frac{1}{10}$ of 1 per cent by weight of formic acid, and consequently, solutions of condensation products made up solely of urea and formaldehyde are actually acid solutions which under ordinary circumstances will have a hydrogen ion concentration of approximately $1 \times 10^{-3}$. As above mentioned, my invention contemplates the condensation of urea and formaldehyde in the presence of a hydrogen ion concentration of approximately $1 \times 10^{-3}$ by a reaction in which a relatively large amount of urea, as compared with the formaldehyde, is employed or in other words, one part of urea to from one to five parts of formaldehyde.

My invention accordingly proceeds upon the principle of introducing the urea in small portions and permitting ebullition to cease after the introduction of each portion before the next portion is introduced.

Prior to my invention, it was believed that in all instances when an amount greater than one-fourth ($\frac{1}{4}$) molecule of urea is added to one (1) molecule of formaldehyde in aqueous solution, that an exothermic reaction occurred even without the application of heat, with the formation of dehydration products of dimethylol urea, which products are granular, white insoluble bodies having no valuable commercial uses, but that, if the amount of urea is kept low, then vitreous products were obtained by distillation of the solution.

I have now found, however, that relatively large amounts of urea may be condensed with formaldehyde at a hydrogen ion concentration of approximately $1 \times 10^{-3}$ without the formation of any insoluble material, provided the condensation is carried out in accordance with my invention. Although several methods may be employed, I have for the purposes of illustration, herein given several specific methods which are known to serve well in the formation of condensation products, but which are not intended to be limitations on my invention, the scope of which is set forth in the appended claims.

It is to be understood in connection with this invention, that when I use the term urea, I mean urea, thiourea or its derivatives, and when I use the term formaldehyde, I mean formaldehyde or its polymers. The following are examples by which my invention may be practiced.

*Process 1*

1200 parts of 40% formaldehyde solution are heated to 90–95° C. under a reflux condenser and 90 parts of urea are added. The solution is then heated to boiling. As soon as ebullition commences the heat is removed, since the reaction that occurs is exothermic, and the solution will continue to boil for some time without the application of external heat. When ebullition ceases, 90 parts more of urea are added. It is unnecessary to apply heat at this stage since the heat of reaction will cause the solution to boil spontaneously upon standing for a few minutes.

When ebullition ceases, 90 parts more of urea are added and the process is continued in this manner until 500 parts of urea have been added, the final portion of urea added consisting of 50 parts.

When the final portion of urea has been added and has reacted, a colorless, rather thin liquid is obtained, which is poured into molds. Upon cooling, the product sets to a stiff gel. Upon standing at room temperature, water is eliminated, syneresis occurs, and the product finally becomes very hard, strong and tough. Heating at a slightly elevated temperature, say 50° C. may be resorted to, to hasten the conversion into the final product, but it is unnecessary. This product is unaffected by cold water, but softened by boiling water.

The process differs from that of prior known processes, especially in that the urea is added gradually and in the presence of sufficient acid to produce a hydrogen ion concentration of $1 \times 10^{-3}$. Furthermore, another condensing agent may be substituted for the formic acid present in commercial formaldehyde solution. This step has heretofore been unknown.

For example, to 80 parts of commercial formaldehyde solution is added sufficient alkali or other base to completely neutralize the formic acid. To the neutral solution is added sufficient hydrochloric or other mineral acid to produce a hydrogen ion concentration of $1 \times 10^{-3}$. Thirty (30) parts of urea are then added at 90–95° C. in portions of 6 parts in the manner previously described. Exactly similar results are obtained as when formic acid was used as the condensing agent. The intermediate products made by the above method contain considerable quantities of water. In order to reduce the proportion of water present, paraformaldehyde may be used to replace a portion of the formaldehyde. For example, 20 parts of paraformaldehyde are added to 80 parts of formaldehyde solution, and to the mixture are added 50 parts urea in portions of 10 parts each. The manner of addition is that previously described, except that the solution should be boiled a trifle longer between each addition of urea.

Process 2

Products made according to the preceding method, contain considerable quantities of water and on drying shrinkage occurs. In some cases this is objectionable.

To do away with this undesirable feature, the process may be carried out in three steps, namely, (1) condensation of the urea and formaldehyde at a hydrogen ion concentration of $1 \times 10^{-3}$; (2) distillation of the free water from the condensation product at a hydrogen ion concentration of $1 \times 10^{-7}$ or less, and (3) conversion of the condensation product into the final product at a hydrogen ion concentration of from $1 \times 10^{-5}$ to $1 \times 10^{-3}$.

For example, 75 parts of urea are condensed with 200 parts commercial formaldehyde at a hydrogen ion concentration of $1 \times 10^{-3}$ as described under Process 1. The successive portions of urea consisting of 15 parts each. To the product is then added sufficient caustic soda or other base to lower the hydrogen ion concentration to $1 \times 10^{-8}$ and the product is heated in a distilling flask until substantially all of the free water has been eliminated. Sufficient dilute acid, either organic or inorganic is then added to raise the hydrogen ion concentration to $1 \times 10^{-5}$ or more and the distillation is continued until the product is of the correct viscosity for casting. The cast articles are transformed into the final, infusible, tough, hard, strong products by being subjected to a heat treatment ranging from 50 to 100° C. over the course of several days or weeks depending upon the thickness of the articles.

Process 3

This is an improvement on Process No. 1. The process consists of obtaining condensation products of urea and formaldehyde by causing the initial condensation to proceed at a hydrogen ion concentration of $1 \times 10^{-3}$, and then reducing the hydrogen ion concentration to $1 \times 10^{-5}$ in order to obtain the intermediate condensation products.

For example, to 200 parts of 40% formaldehyde are added 75 parts of urea in portions of 15 parts each in the manner described under Process No. 1. To the initial condensation product thus obtained is added 1 part manganese acetate and the solution is distilled until substantially all of the uncombined water has been eliminated, the residue is cast and hardened by being heated at 60 to 100° C.

Of course, any method of reducing the hydrogen ion concentration to $1 \times 10^{-5}$ for the second operation will give results similar to those obtained by the use of maganese acetate. For example, caustic soda, sodium carbonate, or hexamethylenetetramine in the proper amounts may be used.

Among the advantages which are realized in practicing my invention over other known processes in the art, are: first, that in the event formaldehyde is used, the amount of water to be distilled off is quite materially reduced and second, clear solutions obtained as the result of the initial reaction are quite stable and may be kept indefinitely without the addition of any stabilizing agents, this not being the case of products made with an alkaline condensing agent which require that they be neutralized exactly with an acid or that an addition of a retarding agent such as sodium acetate or sodium borate be made to keep the product from increasing spontaneously in viscosity; third, according to my processes, a product is formed which has a comparatively small amount of salts, alkalis or strong acids present which are highly undesirable for some purposes; fourth, the curing of the product to a non-vesicular mass to a great extent is facilitated by the very small ratio of formaldehyde, condensed with urea in the presence of an acid; fifth, distillation under reduced pressure is not absolutely necessary as in some cases, but may be desirable for the manufacture of large batches.

In general, the properties of my product are: it is transparent, although it may be rendered opaque or may be colored; it is tough, strong, insoluble in water, but softened by boiling water and infusible in the sense that it does not melt to a liquid, but decomposes in the neighborhood of 400° F. with effervescence.

The term "water soluble product" as used above and in the appended claims, is meant to include substances held in solution either in a molecularly or colloidally dispersed form, such that they do not precipitate from the solution in which it is formed.

In the appended claims the term "formaldehyde" is intended to mean a 40 per cent solution of formaldehyde and in the proportions of formaldehyde and urea referred to, this should be taken into account.

I claim:

1. A composition of matter formed by heat treating a water soluble reaction product of 1 part of urea and from 1 to 5 parts of formaldehyde reacted in the presence of a pH of approximately $1 \times 10^{-3}$, in which the urea is added and reacted in small portions at a time.

2. The water soluble reaction product of 1 part of urea and from 1 to 5 parts of formaldehyde reacted in the presence of a pH of approximately $1 \times 10^{-3}$, in which the urea is added and reacted in small portions at a time.

3. A composition of matter formed by heat treating a water soluble reaction product of 1 part of urea and from 1 to 5 parts of formaldehyde in the presence of an acid solution, in which the urea is added and reacted in small portions at a time.

4. A composition of matter formed by heat treating a water soluble reaction product of 1200 parts of 40% formaldehyde solution and 500 parts of urea reacted in the presence of a pH of approximately $1 \times 10^{-3}$, in which the urea is added and reacted in small portions at a time.

5. The process of forming water soluble condensation products from, 1 part of urea and from 1 to 5 parts of formaldehyde in the presence of an acid solution, which consists in adding the urea in small portions to the formaldehyde, and permitting ebullition to cease after the introduction of each portion before the next portion is introduced.

6. The process of forming water soluble condensation products from, one part of urea and from one to five parts of formaldehyde, which consists in establishing a hydrogen ion concentration of approximately $1 \times 10^{-3}$ in the reaction solution and adding the urea in small portions.

7. The process of forming water soluble condensation products from, one part of urea and from one to five parts of formaldehyde, which consists in establishing a hydrogen ion concentration of approximately $1 \times 10^{-3}$ in the reaction solution and adding the urea in small portions, and permitting ebullition to cease after the introduction of each portion before the next portion is introduced.

8. The process of condensing urea and formaldehyde which consists in introducing a small portion at a time of, one part of urea to from one to five parts of formaldehyde in the presence of a hydrogen ion concentration of approximately $1 \times 10^{-3}$.

9. The process of condensing urea and formaldehyde which consists in introducing a small portion at a time of, one part of urea to from one to five parts of formaldehyde in the presence of a hydrogen ion concentration of approximately $1 \times 10^{-3}$ and then hardening the condensation product.

10. The process of condensing urea and formaldehyde which consists in introducing a small portion at a time of, one part of urea to from one to five parts of formaldehyde in the presence of a hydrogen ion concentration of approximately $1 \times 10^{-3}$, and then molding and hardening the condensation product.

11. The process of condensing urea and formaldehyde which consists in introducing a small portion at a time of, one part of urea to from one to five parts of formaldehyde in the presence of a hydrogen ion concentration of approximately $1 \times 10^{-3}$, and then hardening the concentration product by heat.

12. The process of condensing urea and formaldehyde which consists in introducing a small portion at a time of, one part of urea to from one to five parts of formaldehyde in the presence of a hydrogen ion concentration of approximately $1 \times 10^{-3}$ and permitting ebullition to cease after the introduction of each portion of urea, before the next portion is introduced.

13. The process of condensing urea and formaldehyde which consists in introducing a small portion at a time of, one part of urea to from one to five parts of formaldehyde in the presence of a hydrogen ion concentration of approximately $1 \times 10^{-3}$ and distilling off the free water from the condensation product.

14. The process of condensing urea and formaldehyde which consists in introducing a small portion at a time of, one part of urea to from one to five parts of formaldehyde in the presence of a hydrogen ion concentration of approximately $1 \times 10^{-3}$ and distilling off the free water from the condensation product at a hydrogen ion concentration of approximately $1 \times 10^{-7}$.

15. The process which consists in condensing urea and formaldehyde at a hydrogen ion concentration of approximately $1 \times 10^{-3}$, then distilling off the free water from the condensation product at a hydrogen ion concentration of approximately $1 \times 10^{-7}$, and finally converting the condensation product into a final product at a hydrogen ion concentration of from $1 \times 10^{-5}$ to $1 \times 10^{-3}$.

16. The process which consists in condensing urea and formaldehyde at a hydrogen ion concentration of approximately $1 \times 10^{-3}$, and then establish a hydrogen ion concentration of approximately $1 \times 10^{-5}$ for further treating said product.

17. The process which consists in heating 1200 parts of 40% formaldehyde solution to approximately 90–95° C. under a reflux condenser and adding to the formaldehyde, 500 parts of urea in portions of approximately 90 parts each, while permitting ebullition occurring after the introduction of the portion to cease before the next portion is introduced.

18. The process which consists in heating 1200 parts of 40% formaldehyde solution to approximately 90–95° C. under a reflux condenser and adding to the formaldehyde, 500 parts of urea in portions of approximately 90 parts each, while permitting ebullition occurring after the introduction of the portion to cease before the next portion is introduced, and then pouring into molds and hardening.

19. The process which consists in heating 1200 parts of 40% formaldehyde solution to approximately 90–95° C. under a reflux condenser and adding to the formaldehyde, 500 parts of urea in portions of approximately 90 parts each, while permitting ebullition occurring after the introduction of the portion to cease before the next portion is introduced, and then eliminating water and pouring into molds and hardening.

Signed at Chicago, Illinois, this 31st day of May, 1927.

OSCAR A. CHERRY.